(12) United States Patent
Hebert

(10) Patent No.: US 7,716,909 B2
(45) Date of Patent: May 18, 2010

(54) APPARATUS AND METHOD FOR PICKING UP BERRIES

(75) Inventor: Dario Hebert, 31, Grand rang Sud, Albanel, QC (CA) G8M 3L7

(73) Assignee: Dario Hebert, Albanel (Québec) (CA)

( * ) Notice: Subject to any disclaimer, the term of this patent is extended or adjusted under 35 U.S.C. 154(b) by 0 days.

(21) Appl. No.: 12/183,371

(22) Filed: Jul. 31, 2008

(65) Prior Publication Data

US 2010/0024372 A1    Feb. 4, 2010

(51) Int. Cl.
  *A01D 46/00*    (2006.01)
(52) U.S. Cl. .......................................................... 56/330
(58) Field of Classification Search ................ 56/328.1, 56/341, 329, 330, 331
  See application file for complete search history.

(56) References Cited

U.S. PATENT DOCUMENTS

| 1,496,219 | A | * | 6/1924 | Hall ............................. 56/330 |
| 2,696,706 | A | * | 12/1954 | Getsinger ..................... 56/330 |
| 2,874,530 | A | * | 2/1959 | Miller, Sr. ................... 56/400.1 |
| 3,648,447 | A | * | 3/1972 | Burton ......................... 56/330 |
| 3,901,010 | A | * | 8/1975 | Pajunen ................... 56/400.08 |
| 4,447,323 | A | * | 5/1984 | Jackson ....................... 210/158 |
| 4,776,158 | A | * | 10/1988 | Baum ....................... 56/400.08 |
| 5,059,313 | A | * | 10/1991 | Etschel et al. ............... 210/155 |
| 5,369,944 | A | * | 12/1994 | Robichaud .................... 56/330 |
| 5,375,403 | A | * | 12/1994 | Collins et al. ................ 56/330 |
| 5,425,459 | A | * | 6/1995 | Ellis et al. ................... 209/671 |
| 5,501,069 | A | * | 3/1996 | Lentz ......................... 56/400.1 |
| 5,713,193 | A | * | 2/1998 | Stapley et al. ........... 56/400.08 |
| 6,000,203 | A | * | 12/1999 | Weatherbee et al. ......... 56/14.9 |
| 6,722,115 | B2 | * | 4/2004 | DeWinter ................ 56/400.12 |
| 6,851,254 | B1 | * | 2/2005 | Dalfors .................... 56/400.08 |
| 6,990,794 | B2 | * | 1/2006 | Merant ....................... 56/328.1 |
| 7,275,359 | B2 | * | 10/2007 | Merant et al. ............. 56/328.1 |

FOREIGN PATENT DOCUMENTS

GB    2277857 A    * 11/1994

* cited by examiner

*Primary Examiner*—Árpád Fábián-Kovács
(74) *Attorney, Agent, or Firm*—Ogilvy Renault, LLP

(57) ABSTRACT

A berry harvester movable along berry bushes in a berry field for picking berries includes a rake head having a plurality of spaced apart rake teeth. The rake teeth form a rake having a top face for collecting berries and a bottom face which faces a ground of the berry field in a harvesting position. A cleaner is mounted on the rake head and is juxtaposed to a bottom face of the rake and has protrusions extending in interspaces defined between the rake teeth from the bottom face towards the top face.

12 Claims, 8 Drawing Sheets

APPARATUS AND METHOD FOR PICKING UP BERRIES

BACKGROUND

Berry harvesting, particularly blueberry harvesting, is often performed by hand-picking or by raking through the berry bushes. This is a tedious work particularly for wild blueberries, which bushes barely extend a couple of centimeters above the ground.

Over the years, mechanical harvesters have been proposed to increase the speed or efficiency at which the harvesting is performed. Generally, such mechanical harvesters comprise a rake for raking the bushes, a collector for receiving and collecting the berries as they are detached from the bushes by the rake, and a transporting mean such as a conveyor for transporting the berries from the collector to a container. In order to increase efficiency, mechanical harvesters usually have the capacity to move along the berry field, in order to pick up berries in most or all of the bushes.

Current mechanical harvesters usually advance over a row of berry bushes while raking the branches of the bushes. This raking movement involves a sliding of the branches between the teeth of the rake under the movement of the harvester. Since the space between the rake teeth is usually smaller that the mean diameter of a berry, the berries are retained on the rake. Their transfer towards the collector is usually made by tilting up the rake, orienting it substantially vertically so that gravity will pull the berries toward the base of the rake, where the collector can collect them before they are move toward the transporting mean.

While such harvesters are efficient in harvesting low bushes such as wild blueberry bushes, one problem is that the rake must be periodically cleaned to remove the bush debris, such as broken branches, leaves and berries, that stuck in between the teeth during operation. Without periodical cleaning during harvesting, such bush debris are accumulating between the rake teeth, reducing the efficiency of the raking and the harvesting.

One way to perform the periodical cleaning of the rake's teeth during harvesting is by adding a slidable cleaning bar to the rake portion of the harvester. Such cleaning bar is mounted over the rake, and usually adapted to slidably move from the base to the end of the teeth of the rake. Gravity ensure that the cleaning bar will stay in contact with the rake teeth underneath it during the sliding movement. However, while such a cleaning of the rake teeth is improving the subsequent raking of further bushes, it results in the loss of valuable berries that will either be squashed or fall on the ground as a result of the sliding action of the cleaning bar. Therefore, the cleaning of the rake causes an appreciable loss of berries, while improving the global harvesting process by periodically ensuring that the rake is clean for raking through the bushes. Still, it would be highly desirable to have a system allowing for the collection of a maximum of berries, while reducing the loss of berries to a minimum, thereby optimizing the mechanized harvesting process.

SUMMARY

According to a general aspect, there is provided a berry harvester comprising: a rake head having a plurality of spaced apart rake teeth extending forwardly from a rake base to form a rake having a top face for collecting berries and an opposed bottom face; and a cleaner extending below the bottom face of the rake and slidable along the rake teeth in conformity with the bottom face of the rake for cleaning the rake.

According to another general aspect, there is provided a berry harvester comprising: a rake head having a plurality of teeth having a tooth base mounted to a rake base and an opposed tooth tip, and defining a rake top face for collecting berries and a rake bottom face, opposed to the rake top face, adjacent teeth being spaced apart from one another and defining teeth interspaces therebetween; and a roller rotatably mounted to the berry harvester, below the rake head, proximate to the tooth base, and abutting the rake head, at least one of the rake head and the roller having a plurality of notches juxtaposed to the other one of the rake head and the roller to vibrate the rake head when the roller is rotating.

According to a further general aspect, there is provided a method for collecting berries by moving a berry harvester in a field of berries. The method comprises the steps of: raking through berry bushes with a rake head having a plurality of spaced-apart rake teeth in a harvesting position; moving the rake head from the harvesting position into a collecting position; and sliding a cleaner extending below a bottom face of the rake head from a rake base to free extremities of the rake teeth, opposed to the rake base, when the rake head in the collecting position.

According to still another general aspect, there is provided a method for cleaning a berry collecting rake head having a plurality of spaced-apart rake teeth, the method comprising: sliding a cleaner located below a bottom face of the rake head from a rake base to free extremities of the rake teeth with cleaning protrusions extending from an outer surface of the cleaner into interspaces defined between adjacent rake teeth.

According to another general aspect, there is provided a rake head comprising: a rake base securable to a berry collector; a plurality of teeth having a tooth base mounted to the rake base and an opposed tooth tip, and defining a rake top face for collecting berries and a rake bottom face opposed to the rake top face, wherein adjacent tooth being spaced apart from one another and defining therebetween tooth interspaces; and a tooth interspace cleaner mounted below the rake bottom face and having protrusions extending in the tooth interspaces, the tooth interspace cleaner being slidable between the tooth base and the tooth tip with protrusions being inserted in the tooth interspaces.

According to another general aspect, there is provided a rake head roller for a berry harvester rake head comprising a roller frame rotatably mountable to a berry harvester and supporting the berry harvester rake head above the ground, wherein the displacing of the berry harvester rake head rotates the roller frame and the rake head vibrating upon rotation of the roller frame.

BRIEF DESCRIPTION OF THE DRAWINGS

Having thus generally described the nature of the invention, reference will now be made to the accompanying drawings, showing by way of illustration, a preferred embodiment thereof, and in which:

FIG. 3 further comprises an enlarged view of the rake teeth;

DETAILED DESCRIPTION

Figure 1:
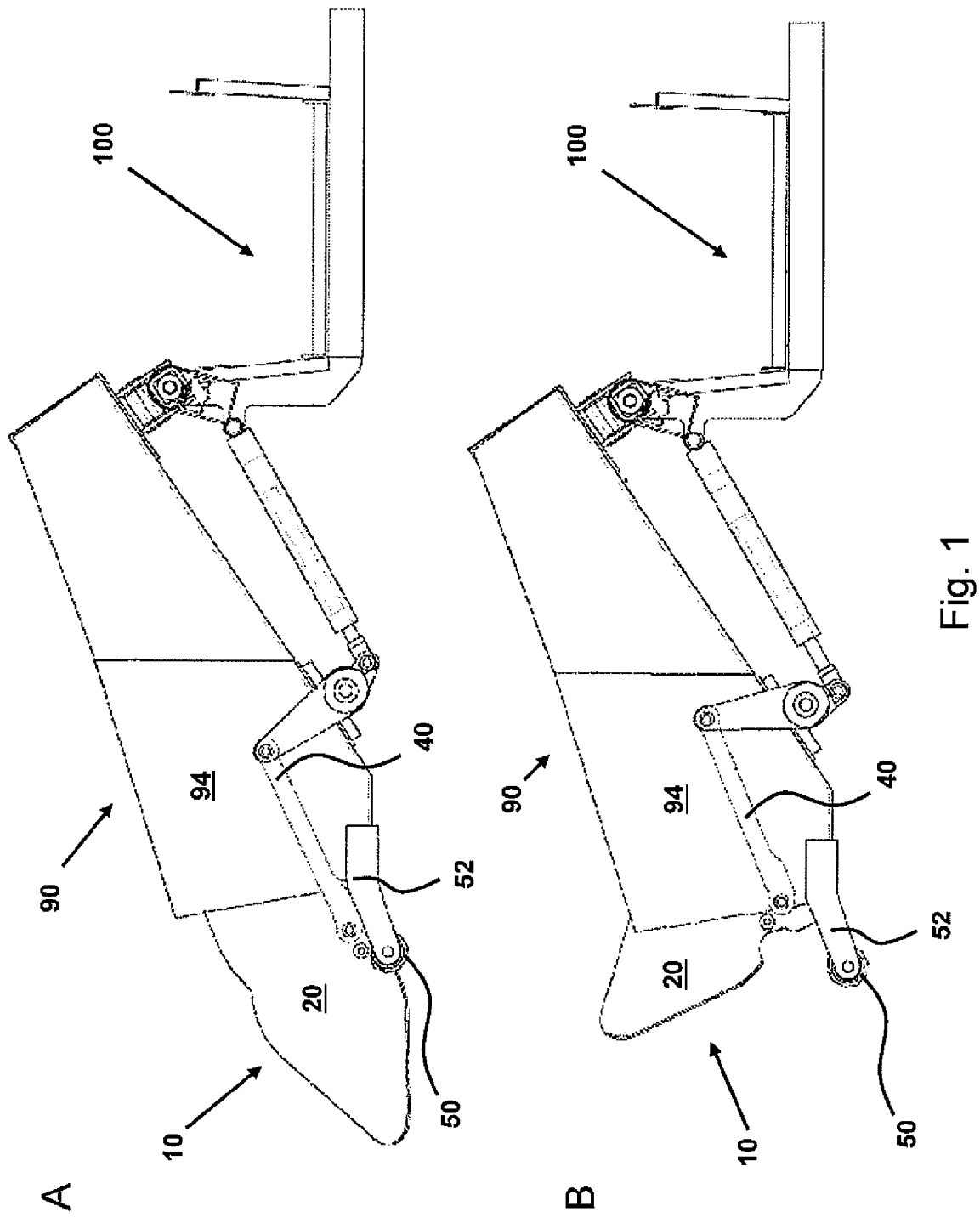
FIG. 1 includes FIGS. 1A and 1B and illustrates a side elevation view of an example of a berry harvester having a rake head (10) alternatively adjustable in a harvesting position (FIG. 1A) or in a collecting position (FIG. 1B)

Referring now to the figures, an example of a berry harvester having a rake head 10 coupled to a collector 90 and generally mounted on a supporting structure 100 is exemplified in FIG. 1. Usually, the supporting structure 100 is designed to be mounted in front of a tractor or the like, so that the berry harvester can be moved along the berry bushes as the harvesting takes place. In an embodiment, the rake head 10 is pivotally coupled to the collector 90 by way of a pivot or any other similar type of coupling mean allowing for the reversible transition of the rake head 10 between a harvesting position (FIG. 1A) and a collecting position (FIG. 1B). In one embodiment illustrated in FIG. 3, the collector 90 is having a floor 92 and at least two side walls 94 for receiving the collected berries.

When the collector 90 has collected a sufficient quantity of berries, a piston-like arm 102 connecting the supporting structure 100 to the collector 90 can be extended to allow for the vertical tilting of the berry harvester from a collecting position (FIG. 2A) to a discharging position (FIG. 2C). When in the discharging position, the berries collected on the collector 90 are transferred, by gravity or any other suitable mean, onto a system such as a collecting basket or a conveyer belt on the supporting structure 100. Alternatively, the berry harvester can be tilted in an intermediate position (FIG. 2B) instead of a full discharging position.

Figure 3:
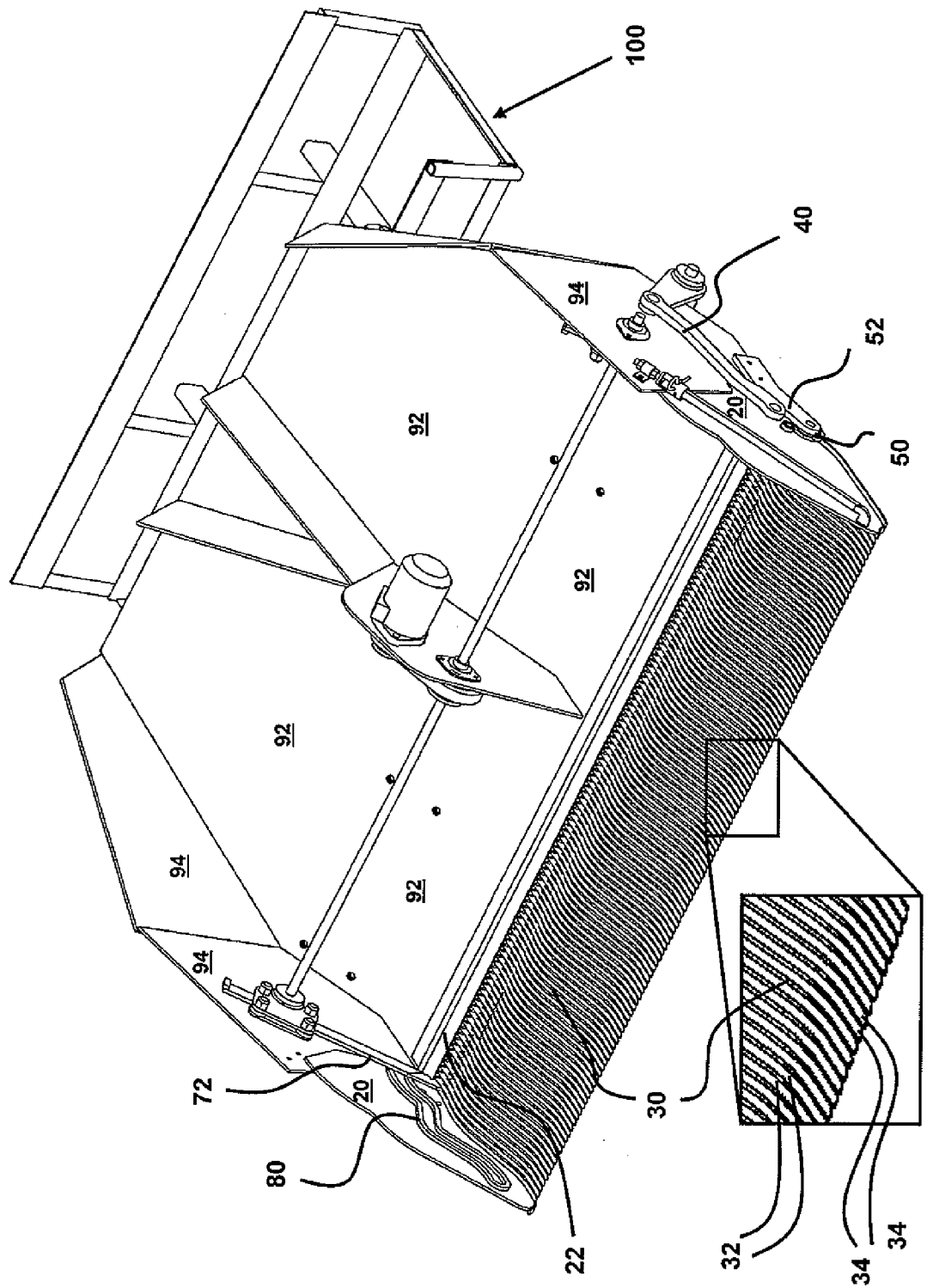
FIG. 3 illustrates a perspective view of the berry harvester of FIG. 1A, with the rake head in harvesting position.

With reference to FIG. 3, the rake head 10 comprises a rake base 22 from which are protruding forwardly a plurality of rake teeth 32 spaced apart one from another to from a rake 30. In an embodiment, the rake 30 only has a single row of teeth 32. In another embodiment, the rake 30 has a plurality of adjacent or superposed rows of teeth 32. The teeth 32 can have a round, oval, square or polygonal cross-section. The free extremities of the teeth 32, also referred to as teeth tips 34, can be of any suitable shape for collecting berries as described herein, including flat, rounded or pointed.

The plurality of teeth 32 are defining a plurality of interteeth spaces, corresponding to spaces between adjacent teeth 32. Those spaces are defined by the distance between two adjacent teeth 32, which, in an embodiment, is constantly the same for any adjacent teeth 32 of the rake 30. In another embodiment, the space between any adjacent teeth 32 is constant throughout the tips 34 of the teeth 32 to the rake base 22, exception made of the minor variations caused by teeth tips 34 having particular shapes, such as rounded or pointed.

Generally speaking, the interteeth spaces are at least wider than the average diameter of a regular-size branch of a berry bush, and at least narrower than an average berry, in order to successively allow for the insertion of a branch between two adjacent teeth tips 34 of the rake head 10, the sliding of the branch between the two adjacent rake teeth 32, the detaching of berries from the branch by the rake teeth 32 during or following the sliding of the branch, and for the retention of the detached berries on the rake 30. For example, the space between any two adjacent teeth 32 can be of 3/16 inch, but can be comprised in the range of 1/8 to 3/8 inch. The detaching of the berry from the branch can result from the action of the rake base 22 on the berry attached to a branch that has slided all the way in the interteeth space. The harvester advancing in the field, it causes a relative advancement of the rake throughout the bush branches, and thus the stopping of the branches inserted in the interteeth spaces onto the rake base 22. Since the rake continues to advance, it causes the rake base 22 to exert a pushing force on the berry that sufficient for detaching the berry from the branch.

The number of teeth 32, as well as their size, width, length, shape and design are in accordance with what is known in the art, and can be adjusted by the skilled worker according to specific needs and requirements for berry harvesting, such as for example the particulars of blueberry harvesting or strawberry harvesting. In an embodiment, the teeth 32 are made from metal, such as steel, or polymer and have a length of between 6 and 20 inches and a thickness of between 1/8 to 3/8 inch. In a further embodiment, the teeth 32 are made from stainless steel or steel having a relatively low carbon content, and are 14 inches long and 1/4 inch thick.

Figure 4:
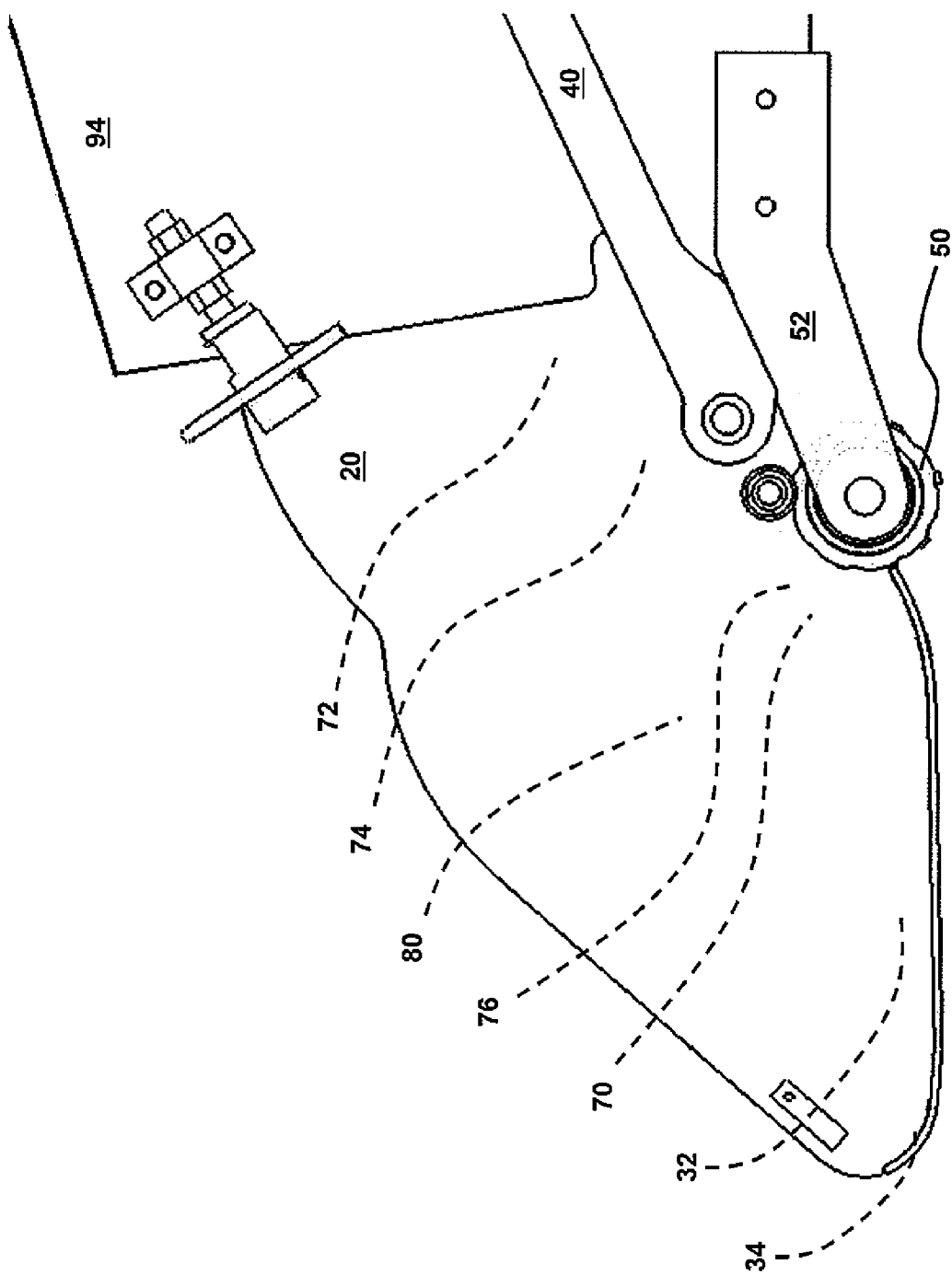
FIG. 4 illustrates a side elevation view of the rake head of the berry harvester of FIG. 1A, with the cleaning guide (80) and the cleaner (70) visible in dashed lines.

In another embodiment, the teeth 32 are curved in an enlongated S-like shape, as illustrated on FIG. 4, but can be curved in any suitable fashion allowing the raking, lifting, detaching and retaining of the collected berries onto the rake 30. For example, a S-like curvature of the teeth 32 can allow for a two-step harvesting technique, with the first step involving the first portion of the teeth 32, from the teeth tip 34 to about the middle of the S-like shape teeth 32, and the second step involving a second portion of the teeth 32, from about the middle of the S-like shaped teeth 32 to the rake base 22. The first step comprises the raking and lifting of the berry from the bush branch, while the second step comprises the detaching of the berry and its retention onto the rake 30 by the middle portion of the S-like shape of the teeth 32.

Traditional rakes for collecting berries and mechanical harvesters frequently tear or dig up the most part of the bush and branches with the berries during raking, particularly when the branches are coming in contact with the rake base. However, in an embodiment of the present invention wherein the teeth 32 has a S-like shape, the first step of the above discussed two-steps technique allows for the peeling of the berry bush or branch before the bush or branch comes in contact with the rake base 22, thus reducing the tearing and digging of berry bushes and branches, and therefore decreasing the losses usually associated with the automation of berry harvesting.

In addition, the elongated S-like shape of the teeth 32, and of generally the rake 30 as illustrated on FIG. 3, allows for the maximization of the retaining of detached berries onto the rake 30. In addition, the curvature of the teeth 32 allow for a better contact with a teeth cleaner 70, as it will be apparent hereinafter. Generally, every tooth 32 of the rake 30 has the same size, width, length, shape and design so as to form a uniform rake 30. The width of the rake, generally corresponding to the number of teeth 32, is compatible with an efficient berry harvesting, and can be adjusted based on the operator's preference. For example, in an embodiment, all teeth 32 are parallel on to another.

The rake 30 comprises the rake teeth 32, generally defining a back portion of the rake 30 roughly corresponding to the rake base 22, and a front portion of the rake 30 roughly corresponding to the tips 34 of the rake teeth 32. In one embodiment, exemplified on FIG. 3, the rake base 22 is bordered on each side by a rake side wall 20, extending in the same direction as the rake teeth 32. In a further embodiment, each rake side wall 20 is parallel to the directions of the rake teeth 32. In another embodiment, at least one rake side wall 22 is oriented at an open angle, ranging from 0.5° to 45°, from the orientation of the rake teeth 32, for creating a funnel action on the branches entering the rake 30.

In an embodiment, both of the rake side walls 20 are of equal size and shape. In another embodiment, the rake side walls 20 are extending for substantially the entire length of the rake teeth 32, thus bordering the whole rake 30. In another embodiment, the rake side walls 20 are longer or shorter than the length of the rake teeth 32. In yet another embodiment, the rake side walls 20 are extending upwardly above the rake teeth 32 so as to contain the branches inserted between the rake teeth 32, and to retain the collected blueberries on the rake 30.

With reference to FIG. 1, a rake arm 40 is connecting the rake head 10 to the collector 90, allowing for the reversible transition of the rake head 10 from a harvesting position (FIG. 1A) to a collecting position (FIG. 1B). In one embodiment, the rake arm 40 is connecting one rake side wall 20 to the adjacent collector side wall 94, as illustrated in FIG. 1. In another embodiment, a rake arm 40 is connecting each rake side wall 20 to their respective adjacent collector side wall 94. In another embodiment, the rake arm 40 is mounted onto the supporting structure 100 instead of the collector side wall 94. The rake arm 40 can be coupled to an hydraulic actuator or any other kind of actuator to allow for the reversible upward tilting of the front portion of the rake head 10 necessary for the rake head 10 to adopt the collecting position.

Figure 2:
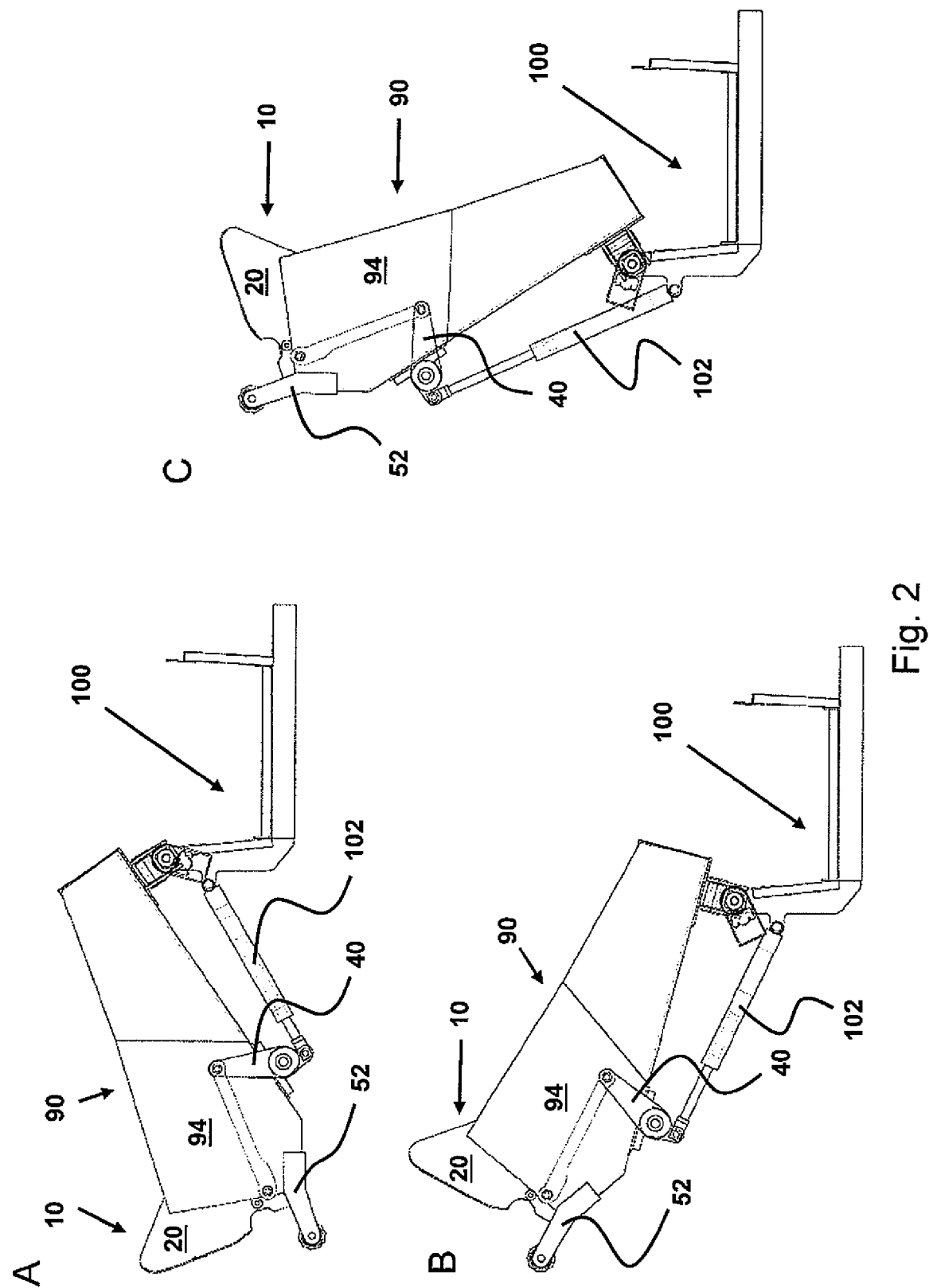
FIG. 2 includes FIG. 2A, FIG. 2B and FIG. 2C and illustrates a side elevation view of the berry harvester of FIG. 1B with the rake head in the collecting position (FIG. 2A) where the collector (90) is pivotally tilted to an intermediate position (FIG. 2B) and to a discharging position (FIG. 2C), allowing the collected berries to be discharged towards a system such as a conveyer belt or a collecting basket (not shown) present on the supporting structure (100) of the berry harvester.

When the rake head 10 is in the harvesting position (FIG. 1A), it allows for the raking of berry bushes by the rake 30. Under the action of the rake arm 40, the front portion of the rake head 10 tilts upward to adopt the collecting position (FIG. 1B) by tilting, or inclining, the rake head 10 relative to the floor 92 of the collector and to the ground (FIG. 2). The collecting position therefore allows for any material, such as berries, retained onto the top face of the rake 30 to slide towards the collector 90 under the action of gravity. In an embodiment, the collector 90 comprises a collector side wall 94 on both or either sides of the collector floor 92 for ensuring that berries sliding from the rake 30 towards the collector 90 will not fall outside of the collector floor 92. In one embodiment, the collector side walls 94 are aligned in substantial continuity with the rake side walls 20.

Figure 5:
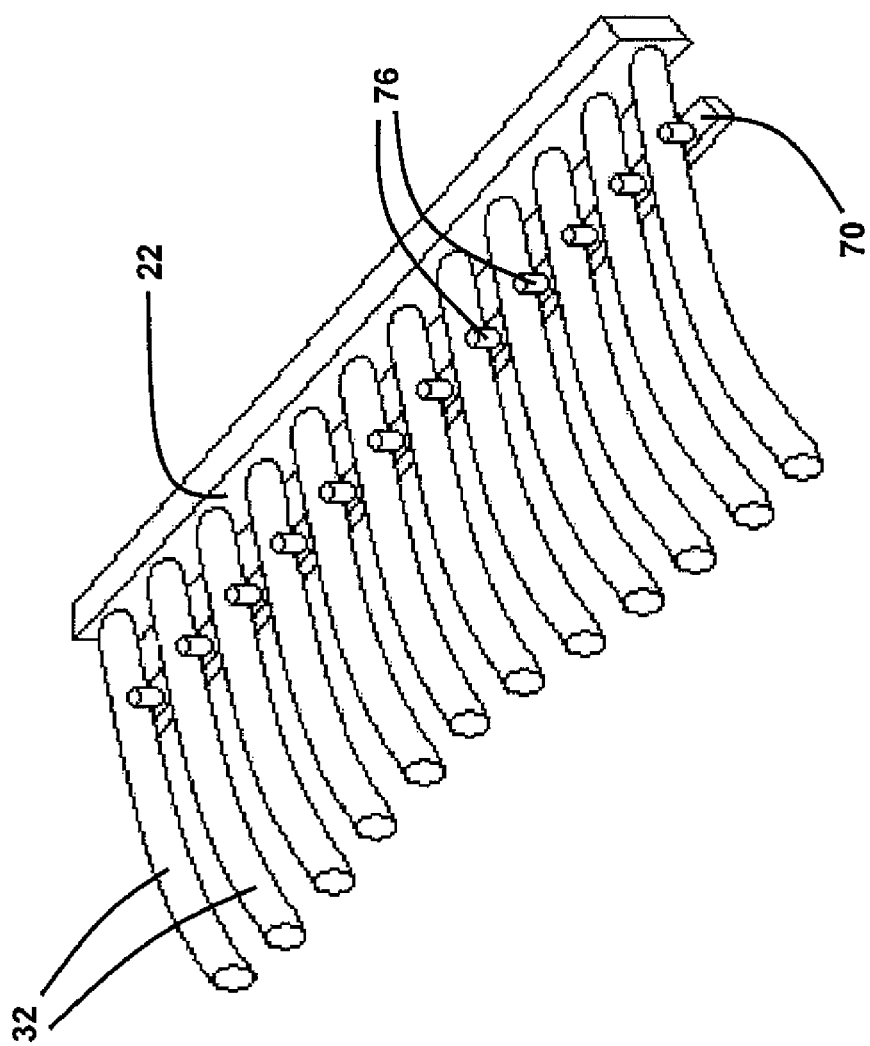
FIG. 5 illustrates a perspective view of an example of a cleaner (70) mounted below a rake, shown with partly sectioned rake teeth (32), the cleaner having protrusions (76) inserted between the rake teeth (32)

With reference to FIGS. 4 and 5, a cleaner 70 is located under the rake 30, extending below the bottom face of the rake 30, which corresponds to the face of the rake 30 directed towards the ground when the rake head 10 is in harvesting position. In one embodiment, the cleaner 70 is extending from or about the distance between the two rake side walls 20.

In one embodiment, the cleaner 70 has a plurality of protrusions 76, each adapted and configured to be inserted into one of the spaces between adjacent rake teeth 32, as illustrated in FIG. 4. The protrusions 76 can be either form in one piece with the cleaner 70, or be a separate piece from the cleaner 70, to which they can be added by a press-fit process or by being glued to it for example. In a further embodiment, the cleaner 70 has the same number of protrusions 76 as there are spaces defined by two adjacent rake teeth 32, and every space is receiving a cleaner protrusion 76. The cleaner protrusions 76 can be of any shape suitable the cleaning of the teeth interspaces. For example, the protrusions 76 are of a shape complementary to the teeth interspaces for optimizing the cleaning of the interspaces. In yet another embodiment, every cleaner protrusions 76 are identical to one another, and have, for example, a height not exceeding the thickness of a rake teeth 32, or the thickness of the rake 30. For example, the cleaner protrusion can be of between ⅛ to ⅜ inch long, and be of between ⅛ to ⅜ inch wide.

Following a raking or harvesting action by the rake head 10, it is common that bushes debris such as small branches, leaves, or even berries, are stuck inbetween the teeth 32 of the rake 30, or in the teeth interspaces, thus reducing the efficiency of the following raking action. The cleaner 70 can be activated, manually or automatically, in order to remove these debris by sliding along the rake teeth 32, from generally the rake base 22 towards generally the teeth tips 34, thus removing these debris and cleaning the rake 30. In one embodiment, the cleaner 70 can be operated when the rake head 10 is in the harvesting position. In another embodiment, the cleaner 70 can be operated when the rake head 10 is in the collecting position. When the rake head 10 is in the collecting position (FIG. 1B), and since the cleaner 70 is mounted on the bottom face of the rake 30, the sliding action of the cleaner 70 along the rake 30 increases the collection of berries by removing the berries that have became stuck in the teeth interspaces, thus making them fall towards the collector 90 under the action of gravity.

With reference to FIG. 4, when the rake head 10 is in harvesting position, the cleaner 70 is located at or near the back portion of the rake 30, such as at or near the rake base 22. In one embodiment, the cleaner 70 is coupled to a cleaner arm 72 connected to a cleaner motor 78 that allows for the sliding of the cleaner 70 along the rake 30. In another embodiment, the sliding of the cleaner 70 along the rake 30 is operated manually by the operator.

Figure 7:
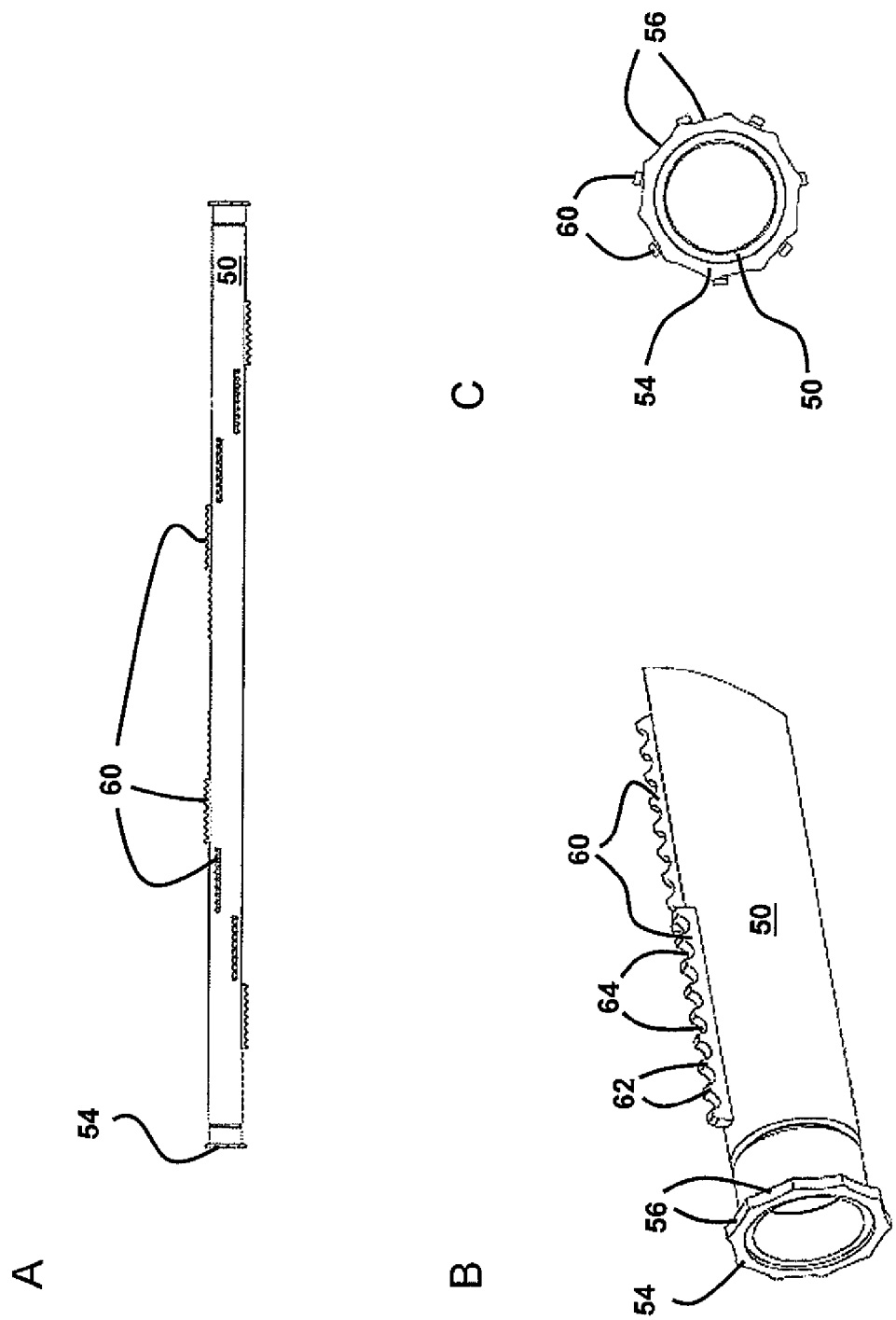
FIG. 7 includes FIGS. 7A, 7B and 7C, with FIG. 7A illustrating a front elevation view of an example of a roller (50), FIG. 7B illustrating an enlarged perspective view, partly sectioned, of an end of the roller of FIG. 7A, and FIG. 7C illustrating a side elevation view of the roller of FIG. 7A.

The sliding action of the cleaner 70 along the bottom face of the rake 30 usually takes place when the rake head 10 is in a collecting position, as illustrated on FIG. 7. The sliding is generally performed in a back-to-front fashion, starting from the back portion of the rake 30, such as near or at starting from or near the rake base 22 (FIG. 7A), towards the front portion of the rake 30, such as near or at the tips 34 of the rake teeth 32 (FIG. 7C). The back-to-front cleaning of the rake 30 by the cleaner 70 is advantageously performed the rake head 10 is in the collecting position. When the rake head 10 is in the collecting position, the back-to-front movement of the cleaner 70 thus corresponds to an upwardly movement of the cleaner 70 relative to the rake 30. Therefore, berries and other debris stuck between the rake teeth 32 are pushed upwardly by the cleaner 70 and then fall toward the collector 90 under the effect of gravity, thus allowing for the recuperation and collection of a maximum of berries for maximizing the harvest.

In one embodiment, the rake 30 or rake teeth 32 has a S-like shape, and a cleaner guide 80 has a corresponding S-like shape for ensuring that the sliding of the cleaner 70 is following the S-like shape of the rake 30 or rake teeth 32, as it will be described in more details below. The sliding of the cleaner 70 on such a S-like path can be split in two steps. The first step involves the sliding of the cleaner 70 from the rake base 22 (FIG. 7A) towards an intermediate portion of the rake 30 (FIG. 7B), which step generally removes most of the branches and debris stuck in the teeth interspaces near the rake base 22. The second step involves the sliding of the cleaner 70 from the intermediate portion of the rake 30 (FIG. 7B) towards the teeth tip 34 (FIG. 7C), which step generally removes most of the debris stuck in the teeth interspaces at the front of the rake 30, and allows for the moving of the berries towards the collector 90. In a further embodiment, at least the second step is performed sufficiently rapidly so that the berries and other debris are propelled upwardly by the movement of the cleaner 70 before falling back towards the collector 90.

The cleaner 70 is coupled to at least one cleaner arm 72 connected to the corresponding and adjacent collector side walls 94, as exemplified on FIG. 4. The cleaner arm 72 is further slidably connected, via a connector 74, to a cleaner guide 80 located on the rake side wall 20. In one embodiment, the connector 74 is a pin or a bearing extending from the cleaner arm 74, and snuggly connected to the cleaner guide 80. In another embodiment, the cleaner guide 80 is a rail, or the like, clamping the connector 74 for maintaining it in place within the cleaner guide 80 while allowing it to slide within the guide 80.

In the embodiment exemplified in FIG. 3, the cleaner arm 72 is connected to the inner face of the collector side wall 94, and the cleaner guide 80 is located on the inner face of a rake side wall 20. The cleaner arm 72 is therefore generally located in the space defined by the last teeth 32 on one side of the rake 30 and the adjacent rake side wall 20, extending under the rake 30 to couple with the cleaner 70. In one embodiment, the cleaner arm 72 is having an adjustment mean for easily removing, replacing or adjusting the cleaner 70 under the rake 30, for usual maintenance and replacement.

The cleaner guide 80 is designed to have a shape complementary with the shape of the rake 30 or rake teeth 32. For example, if the teeth 32 have a curvature of 5° angle on 3 inches long, the cleaner guide 80 is having a complementary curvature at the corresponding emplacement for ensuring that the cleaner guide 80 will keep the cleaner 70 in snug fit with the rake teeth 32 during the sliding of the cleaner 70 along the rake 30. For a further example, if the teeth 32 have a S-like shape, the cleaner guide 80 is having a shape complementary to the shape of the rake teeth 32 for ensuring that the cleaner 70 is sliding along the rake 30 in close association with the rake teeth 32. In yet a further example, the cleaner guide 80 is having a shape complementary to the shape of the rake teeth 32 for ensuring that the protrusions 76 of cleaner 70 are kept at least partly in place into the teeth interspaces during the sliding of the cleaner 70 along the rake 30. In one embodiment, each side of the cleaner 70 is coupled to the cleaner arm 72 slidably connected to the cleaner guide 80 for maximizing the association or snug fit of the cleaner 70 on the rake 30 during its sliding. The shape and design of the rake teeth 32 or the rake 30 is therefore reflected in the shape and design of the cleaner guide 80, for ensuring the close association or snug fit of the cleaner 70, or the constant presence, at least partly, of the protrusions 76 into the teeth interspaces, throughout all of the sliding of the cleaner 70, from the back portion of the rake 30 to the front portion of the rake 30.

In one embodiment, the berry harvester further comprises a roller 50 for supporting the rake head 10 and engaging the ground. The roller 50 therefore help support the rake head 10, particularly while in operation, when the rake head 10 is in the harvesting position, above the ground. In an embodiment, the roller 50 is cylindrical in shape, has a length equivalent to the width of the rake head 10, and is located near the rake base 22, as illustrated in FIGS. 3 and 4. In one embodiment, the roller 50 is rotatably connected to the collector 90, such as to the collector side wall 94, by a roller arm 52. The roller arm 52 therefore ensure that the rake head 10 can move independently of the roller 50, such as when the rake head 10 is put into the collecting position, the roller 50 can still be engaging into the ground and supporting the rake head 10 (FIG. 1).

In one embodiment, the roller 50 comprises a plurality of combs 60 mounted on the roller 50 in a parallel direction to that of the roller 50, as illustrated in FIG. 6A. With reference to FIG. 6B, each comb 60 has a plurality of dents 64 and prongs 62 respectively complementary to the rake teeth 32 and spaces between the rake teeth 32 or teeth interspaces. Each of the dents 64 is adapted and aligned to receive a rake teeth 32, while each of the prongs 62 is adapted and aligned to be inserted in a space defined by two adjacent rake teeth 32. Since the roller is generally located near the rake base 22, the prongs 62 are inserted in the teeth interspaces near the rake base 22. Therefore, the insertion of a prong 62 in a teeth interspace coupled with the rotation movement of the roller 50 allows for a rolling sliding of the prongs 62 in the teeth interspace, thus providing with an additional cleaning of the teeth interspace. This additional cleaning is of particular interest in complement with the cleaning performed by the cleaner 70 since it alleviates at least a part of the cleaning to be performed by the cleaner 70 in what is probably the section of the rake 30 in most need of a cleaning, due to the particularity of the front-to-back movement of the bush branches raked by the harvesting movement of the berry harvester. By moving forward, the berry harvester is causing the roller 50 to rotate on itself, inserting its prongs 62 between the rake teeth 32 at or near the rake base 22 and pushing any debris stuck between the rake teeth 32 towards the front of the rake 30 rather than toward the back portion of the rake, i.e. away from the rake base 22, thus avoiding the accumulation or piling of debris at the back portion of the rake 30. Combined with the action of the cleaner 70, the rotation action of the prongs 62 of the roller 50 on the teeth interspaces at the back portion of the rake 30 is therefore performing a partial cleaning of the rake 30, prior to the cleaning action performed by the cleaner 70, generally performed on the total length of the rake 30.

In addition, the plurality of combs 60 mounted on the roller 50 can also serve the purpose of increasing the gripping action of the roller 50 onto the ground, in combination with the force exerted by the weight of the rake head supported by the roller 50. Since the roller 50 is in direct contact with the ground, it results that the advancing of the berry harvester on the ground is inducing the rotation movement of the roller 50, and thus the cleaning of the rake 30 by the roller 50.

In one embodiment, the roller 50 has a plurality of combs 60 dispersed throughout its periphery. In another embodiment, the combs 60 are of the same length as the length of the roller 50. In yet another embodiment, the plurality of combs 60 is a plurality of combs smaller than the length of the roller 50, and distributed all through the periphery and length of the roller 50, as illustrated on FIG. 7A. Such a distribution of small combs 60 allow for a an even distribution of the force required for the cleaning performed by the combs 60 to the whole periphery of the roller 50, thus minimizing the interference with the rotation action of the roller 50.

Figure 6:
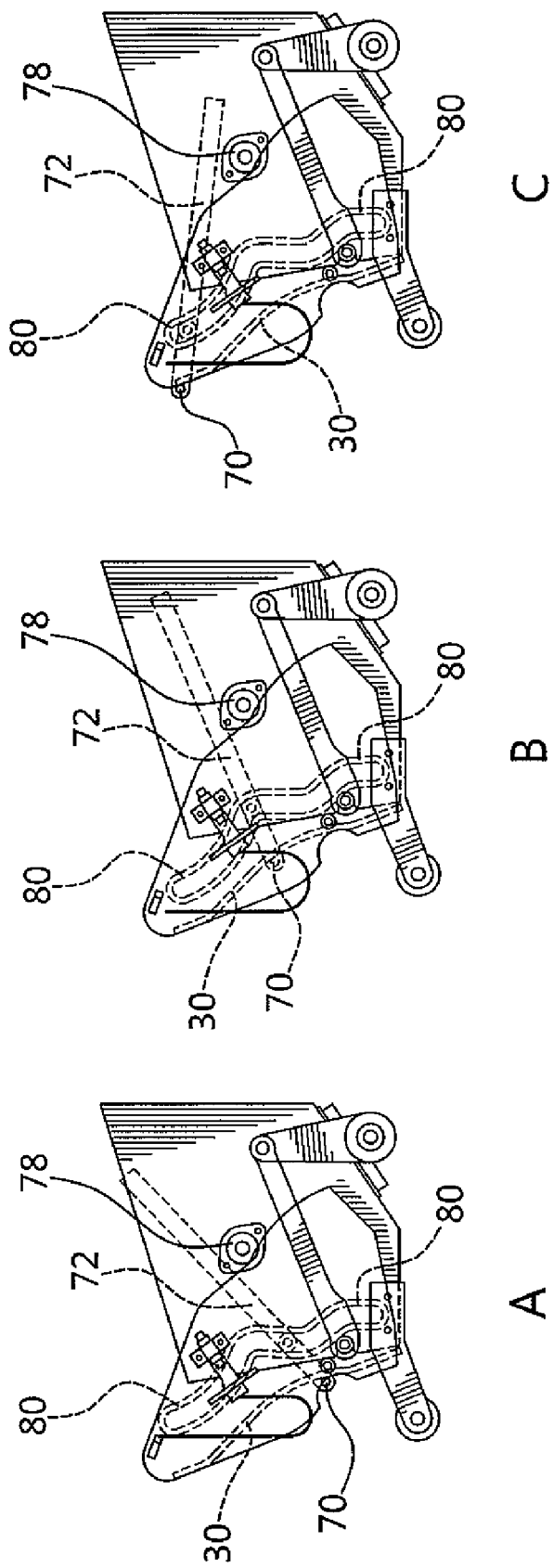
FIG. 6 includes FIG. 6A, FIG. 6B and FIG. 6C and illustrates a side elevation view of the rake head with the cleaner arm (72) supporting the cleaner (70) visible in dashed lines, and following the cleaner guide (80) also in dashed lines, the cleaner moving along the cleaner guide from a resting position (FIG. 6A) to a middle position (FIG. 6B) and to an extended position (FIG. 6C)
Figure 8:
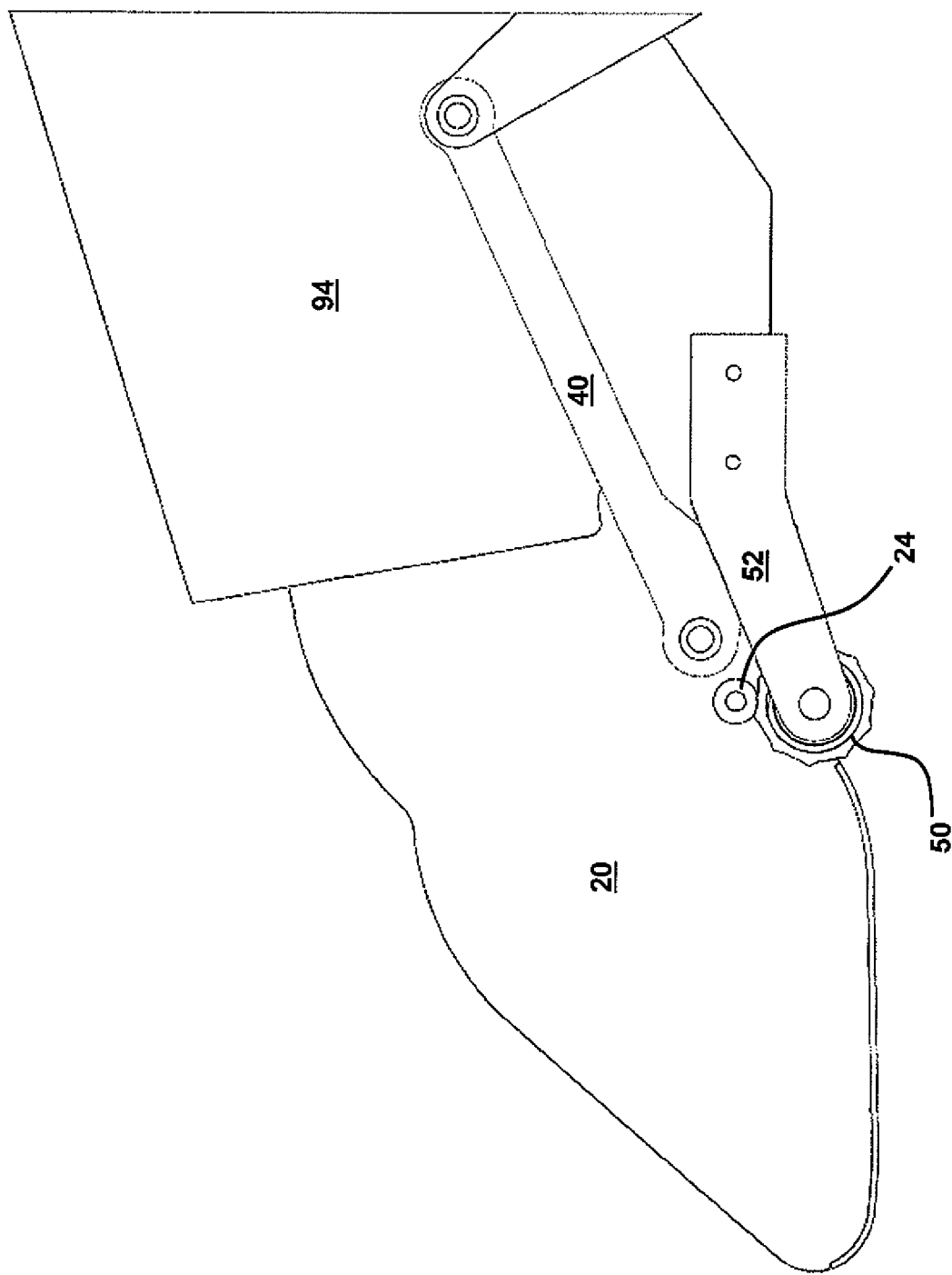
FIG. 8 illustrates an enlarged side elevation view of the berry harvester of FIG. 1A, showing the interaction between the roller (50) and a protrusion (24) on the side wall of the rake head.

In one embodiment, the rake head 10 is made vibrant to maximize the proportion or quantity of debris removed from between the rake teeth 32 by the roller 50. An example of how the rake head 10 is made vibrant is by using a roller 50 as illustrated in FIG. 6 and FIG. 7, where a peripheral rim 54 located at one end of the roller 50 is presenting a plurality of notches 56 (FIGS. 7B and 7C). For example, the roller rim 54 can have about five to ten notches 56 on its periphery, each of the notches being about 1/50 inch deep. These notches 56 are positioned so as to come in contact with a roller protrusion 24 located on the outside face of at least one rake side wall 20 (FIG. 8). Since the roller 50 is supporting the rake head 10, the rotation action of the roller 50 caused by the advancing of the harvester is causing the roller protrusion 24 to alternatively being inserted in and out of the notches 56 on the roller rim 54, thus creating a bumping effect on the rake head 10 that will cause a vibration of the rake head 10, and of the rake 30. The vibration of the rake 30 is maximizing the disengagement of the debris from within the rake teeth 32, and therefore contributes to maximizing the cleaning of the teeth interspaces by the roller 50 and/or the cleaner 70, thus optimizing the harvesting of the berry harvester.

The embodiments of the invention described above are intended to be exemplary only. The scope of the invention is therefore intended to be limited solely by the scope of the appended claims.

The invention claimed is:

1. A berry harvester comprising:
    a movable frame displaceable in the berry field for collecting berries;
    a rake head mounted to the movable frame and extending forwardly thereof, the rake head having a rake base, a rake engageable with berry bushes and including a plurality of spaced apart rake teeth extending forwardly from the rake base and having tooth tips, opposed to the rake base, the rake having a top face for collecting berries and an opposed bottom face facing a ground of the berry field in a harvesting position; and
    a cleaner mounted to the rake head, juxtaposed to the bottom face of the rake, having a plurality of protrusions extending from the bottom face of the rake towards the top face of the rake into the interspaces defined between adjacent rake teeth, and being slidable along the rake teeth in a forth and back motion from the rake base towards the rake tooth tips in conformity with the bottom face of the rake for cleaning the rake.

2. The berry harvester of claim 1, wherein the rake teeth are curved and the cleaner is slidable in conformity with the rake teeth curvature.

3. The berry harvester of claim 2, further comprising a cleaner guide complementary to the shape of the rake teeth and guiding the cleaner in conformity along the shape of the rake teeth.

4. The berry harvester of claim 1, wherein the rake base is pivotable between the harvesting position and at least one collecting position and the cleaner is slidable along the rake base upon configuration of the rake head into one of the at least one collecting position.

5. The berry harvester of claim 3, further comprising a rake head frame and wherein the cleaner guide comprise a rail guide defined in the rake frame and complementary to the shape of the rake teeth and the cleaner is mounted to a cleaner arm having a connector, said connector being slidably mounted to the rail guide.

6. A method for collecting berries by moving a berry harvester on a ground of a field of berries, the method comprising the steps of:
    raking through berry bushes with a movable frame having a rake head mounted thereto, the rake head having a rake engageable with berry bushes and including a plurality of spaced-apart rake teeth and a cleaner juxtaposed to a bottom face of the rake with protrusions extending from the bottom face of the rake towards the top face of the rake into the interspaces defined between adjacent rake teeth, the rake head being configured in a harvesting position with the rake being substantially parallel to the ground and the bottom face facing the ground;
    moving the rake head from the harvesting position into a collecting position; and
    sliding the cleaner from a rake base to free extremities of the rake teeth, opposed to the rake base, when the rake head is in the collecting position.

7. The method of claim 6, further comprising positioning a roller mounted under the rake head and supporting the rake head on the ground, whereby raking through berry bushes rotates the roller.

8. The method of claim 7, wherein said raking further comprises vibrating said rake head.

9. The method of claim 6, wherein the sliding further comprises conforming the sliding movement of the cleaner to the shape of the rake teeth.

10. A rake head securable to a movable berry harvester, the rake head comprising:
    a rake base securable to the berry harvester;
    a rake engageable with berry bushes and including a plurality of teeth having a tooth base mounted to the rake base and an opposed tooth tip, and defining a rake top face for collecting berries and a rake bottom face opposed to the rake top face, wherein adjacent tooth being spaced apart from one another and defining therebetween tooth interspaces; and
    a tooth interspace cleaner juxtaposed to the rake bottom face and having protrusions extending in the tooth interspaces from the rake bottom face towards the rake too face and facing a ground of a berry field in a harvesting position, the tooth interspace cleaner being slidable along the rake in a forth and back motion between the tooth base and the tooth tip with protrusions being inserted in the tooth interspaces.

11. The rake head of claim 10, wherein the plurality of teeth has an elongated S-like curvature and wherein the cleaner is slidable in conformity along the curvature of the rake teeth.

12. The rake head of claim 11, further comprising a cleaner guide complementary to the shape of the rake teeth and guiding the cleaner in conformity along the shape of the rake teeth.

* * * * *